United States Patent [19]

Derrien

[11] Patent Number: 5,337,976
[45] Date of Patent: Aug. 16, 1994

[54] RAISABLE LANDING GEAR FOR HEAVIER-THAN-AIR AIRCRAFT, IN PARTICULAR FOR HELICOPTERS

[75] Inventor: Michel Derrien, Versailles, France

[73] Assignee: Messier-Bugatti, Velizy Villacoublay, France

[21] Appl. No.: 37,417

[22] Filed: Mar. 26, 1993

[30] Foreign Application Priority Data

Mar. 31, 1992 [FR] France ................ 92 03877

[51] Int. Cl.⁵ .................. B64C 25/14; B64C 25/58
[52] U.S. Cl. .................. 244/102 A; 244/104 FP; 244/17.17
[58] Field of Search ......... 244/102 R, 102 A, 102 SS, 244/104 R, 104 FP, 17.17

[56] References Cited

U.S. PATENT DOCUMENTS

| | | | |
|---|---|---|---|
| 2,554,881 | 5/1951 | Levy | 244/102 R |
| 3,346,218 | 10/1967 | Lucien | 244/102 R |
| 4,147,316 | 4/1979 | Kendall et al. | 244/102 R |
| 4,284,255 | 8/1981 | Masclet et al. | 244/104 FP |
| 4,312,485 | 1/1982 | Masclet et al. | 244/102 R |
| 4,537,374 | 8/1985 | Barnoin | 244/102 R |
| 5,029,775 | 7/1991 | Abramovitsh | 244/102 R |
| 5,184,465 | 2/1993 | Howard et al. | 244/102 R |

FOREIGN PATENT DOCUMENTS

| | | |
|---|---|---|
| 0262591 | 9/1987 | European Pat. Off. . |
| 0275735 | 12/1987 | European Pat. Off. . |
| 1128829 | 10/1968 | United Kingdom ............ 244/102 R |
| 2094241 | 3/1982 | United Kingdom . |

Primary Examiner—Michael S. Huppert
Assistant Examiner—Virna Lissi Ansley
Attorney, Agent, or Firm—Sixbey, Friedman, Leedom & Ferguson

[57] ABSTRACT

The invention relates to raisable landing gear including a shock absorbing leg that is pivotally mounted, and to a driving actuator associated therewith. According to the invention, the leg is implemented in the form of two elements that are hinged to each other about an axis parallel to the pivot axis of the leg and that are connected together by means of a shock absorber, the bottom element forming a rocker and the top element forming a panel whose free end is connected to a drive actuator which is a shock-absorbing actuator having a force threshold, said shock-absorbing actuator serving to apply a predetermined torque that maintains the leg in position during normal landing, while allowing said leg to be raised against a controlled force in the event of a crash landing.

10 Claims, 3 Drawing Sheets

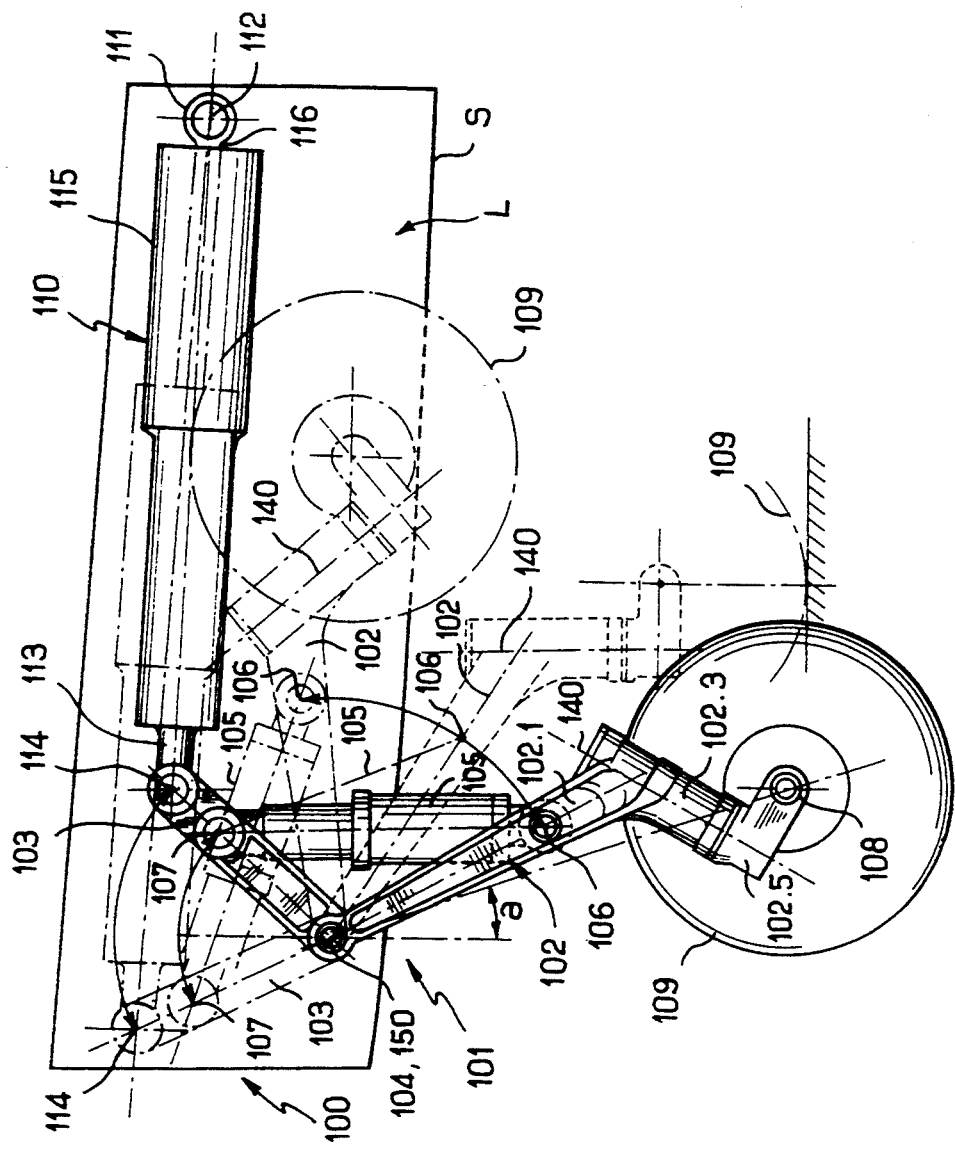
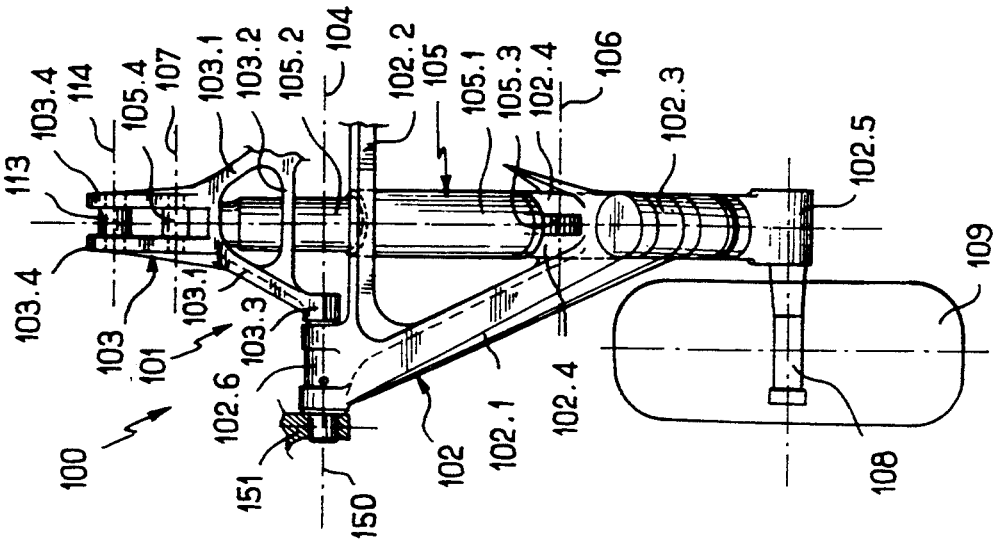

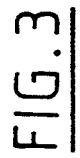

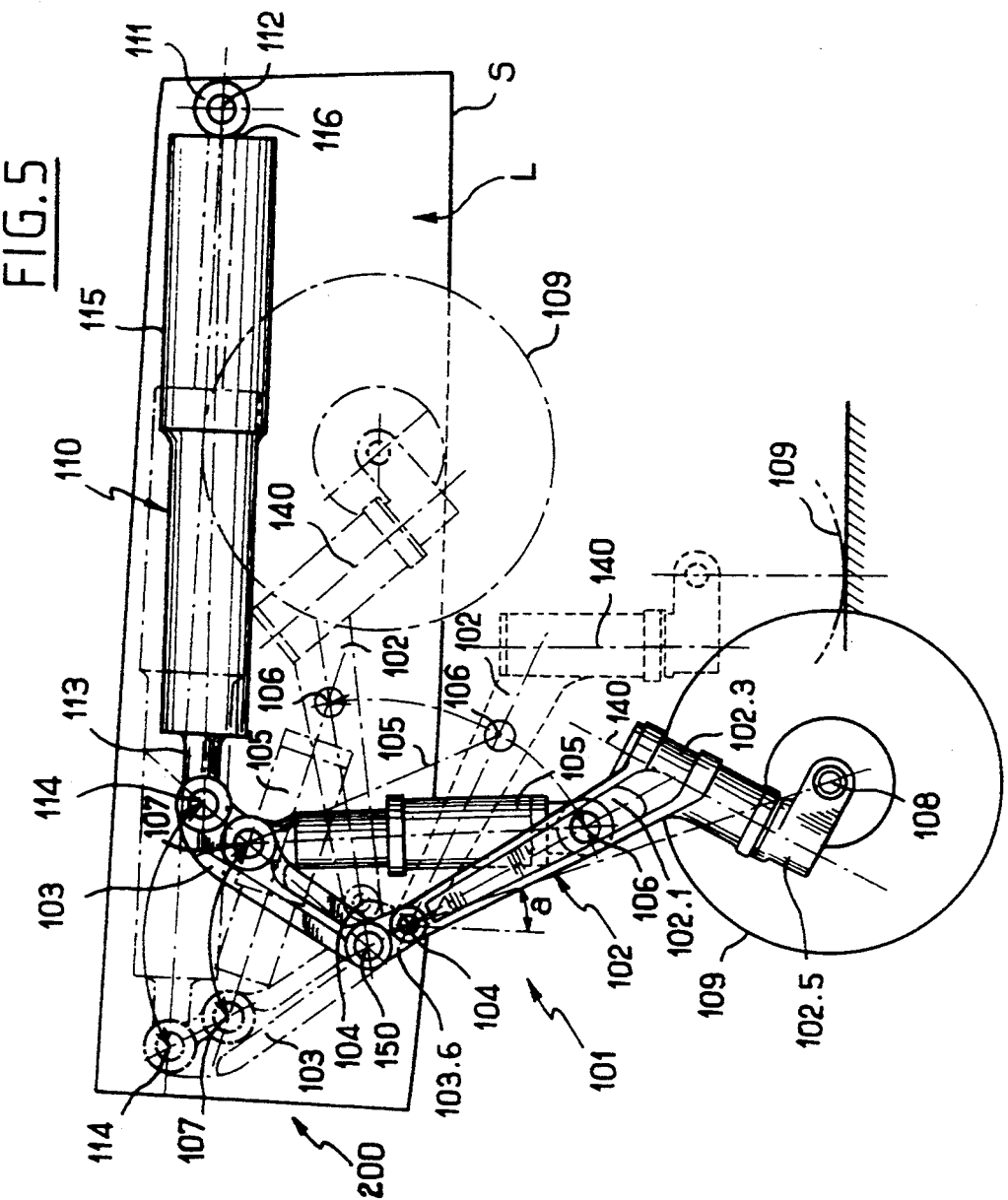

RAISABLE LANDING GEAR FOR HEAVIER-THAN-AIR AIRCRAFT, IN PARTICULAR FOR HELICOPTERS

The present invention relates to raisable landing gear for heavier-than-air aircraft, in particular for helicopters.

BACKGROUND OF THE INVENTION

Conventionally, such landing gear comprises a landing gear leg mounted on a structure of the aircraft to pivot about an axis that is essentially perpendicular to the longitudinal midplane of said aircraft, the leg being provided with at least one wheel stub axle and also with an associated driving actuator which is generally extended for the purpose of raising said leg, the hinge point of said actuator being disposed above the pivot axis of the leg.

Numerous landing gears of that type are known in which the leg is resilient, being constituted by a shock absorbing strut hinged to the structure of the aircraft and by a sliding rod fitted with at least one wheel stub axle (the driving actuator then acting directly on the shock absorber strut to bring the leg into a substantially vertical position for landing, or into a substantially horizontal, raised position). The wheel stub axle is generally disposed at the bottom of the sliding rod, or sometimes it is mounted at the end of a rocker hinged to a fork on the shock absorber strut and likewise connected in hinged manner to the sliding rod.

When it is desired to have landing gear capable of coping with a landing under emergency conditions, commonly called a "crash" landing, it is necessary to be able to use a long stroke and also to provide a device for peak-limiting forces, the device being capable of coming into operation quickly in order to cope with the vertical impact speed which is much greater than under normal landing conditions.

Landing gears already exist that are fitted with means for peak-limiting the forces that occur in the event of excessive overpressure, however those landing gears require the undercarriage to be very tall.

With helicopters, and also with certain airplanes, the raisable landing gear is located beneath the cockpit, such that the vertical extent of the landing gear is generally voluntarily kept small so as to reduce the maximum height of the helicopter, both for the purpose of ensuring good stability for the helicopter with its center of gravity being as low as possible, and for making it possible to store the helicopter in warehouses or on the decks of ships where a maximum height is set by doorways.

With the known landing gears as mentioned above, the upper limit is thus given by a wall that corresponds to the floor of the cockpit.

Consequently, the maximum stroke of the resilient leg is limited, e.g. to a value of about 400 mm.

OBJECTS AND SUMMARY OF THE INVENTION

Such a limited stroke is naturally compatible with the vertical forces encountered under normal landing conditions, however it is generally inadequate for limiting forces in the event of a crash landing.

A particular object of the invention is to solve the above problem by designing a raisable landing gear which is capable of coping with a crash landing situation.

An object of the invention is thus to provide raisable landing gear of a structure that enables sufficient energy to be absorbed during a crash landing, leaving a maximum stroke for its leg.

More particularly, the present invention provides a raisable landing gear for a heavier-than-air aircraft, in particular for a helicopter, the landing gear including a landing gear leg pivotally mounted to the structure of an aircraft about a pivot axis that is essentially perpendicular to the longitudinal midplane of said aircraft and fitted with at least one wheel stub axle, and also with an associated driving actuator for lowering and raising said leg, wherein the landing gear leg is implemented in the form of two elements which are hinged to each other about an axis parallel to the pivot axis of said leg and which are connected together by means of a shock absorber, comprising a bottom element implemented in the form of a rocker whose free end is fitted with at least one wheel stub axle, and a top element implemented in the form of a panel whose free end is hinged to the driving actuator, and wherein said driving actuator is a shock-absorbing actuator having a force threshold which applies a predetermined torque tending to maintain the leg in the position that it occupies during landing, while nevertheless allowing said leg to be raised against controlled force in the event of a crash landing.

In a particular embodiment, the rocker-forming bottom element is hinged to the structure of the aircraft, and the panel-forming top element is hinged to said rocker about an axis which coincides with the pivot axis.

In a variant, the panel-forming top element is hinged to the aircraft structure, and the rocker-forming bottom element is hinged to associated appendices of said panel about an axis which is slightly offset relative to the pivot axis. It is then preferable for the appendices of the panel-forming top element to be organized in such a manner that the axis associated with said appendices is offset in the landing position rearwardly relative to the pivot axis.

Also advantageously, the pivot axis and the hinge axes between the panel-forming top element and both the shock absorber and the shock-absorbing actuator all lie in the same plane.

In a particular embodiment, the panel-forming top element is generally triangular in shape, upwardly terminated by two appendices providing the hinged connections with the shock absorber and with the shock-absorbing actuator, and the rocker-forming bottom element is generally triangular in shape, being downwardly terminated by an angularly offset assembly that forms a swivel wheel support having an axis that is essentially vertical when the landing gear is under static load.

It is also advantageous for the shock-absorbing actuator to extend for the purpose of raising the landing gear leg, and for it to include a rod-piston and a cylinder having two successive chambers separated by an intermediate partition but in communication with each other, there being a first chamber for hydraulic fluid associated with lowering and raising the leg under normal conditions, and a second chamber in which a separator piston delimits a high pressure gas chamber whose pressure defines the force threshold for extending the rod-piston in the event of a crash landing.

It is then advantageous for a distributor valve to be associated with the first chamber to cause the hydraulic fluid of the corresponding annular chamber to transit into the second chamber by passing through at least one associated channel when said distributor valve is closed for the purpose of pushing said separator piston, a floatingly-mounted valve member being provided in said second chamber level with the orifice of said channel(s) to control subsequent expansion of the gas.

Finally, in a particular embodiment, the shock absorber interconnecting the two hinged elements forming the leg is an oleo-strut of the single low-pressure chamber type.

BRIEF DESCRIPTION OF THE DRAWINGS

Other features and advantages of the invention appear more clearly in the light of the following description and the accompanying drawings, which relate to a particular embodiment, and which are described with reference to the figures, in which:

FIG. 1 shows raisable landing gear of the invention with its landing position shown in solid lines and its raised position (under normal circumstances) shown in chain-dotted lines (with its position under static load being outlined in part only by dashed lines);

FIG. 2 is a fragmentary front view of said landing gear, more clearly showing the organization of the two elements that form the leg of the landing gear, with the hinge axis coinciding, in this case, with the pivot axis of the leg;

FIG. 3 is a view showing the above landing gear in its final raised position after a crash landing;

FIG. 4 is an axial section through the shock-absorbing actuator having a force threshold that is fitted to the above-mentioned landing gear, and shown in the configuration it takes up during normal landing;

FIG. 5 shows a variant of the above landing gear, in various different positions that are shown in the same way as in FIG. 1; and FIG. 6 is a fragmentary front view of the FIG. 5 landing gear, to be compared with FIG. 2, and serving to show more clearly the particular structure of the hinge between the two elements forming the landing gear leg, with the two axes being offset in this case.

MORE DETAILED DESCRIPTION

In FIGS. 1 and 2, there can be seen raisable landing gear 100 of the invention, with said landing gear being shown in its landing position by solid lines, and being shown in chain-dotted lines in its normal raised position when said landing gear is received in a housing L in the structure S of a heavier-than-air aircraft. The landing gear 100 includes a landing gear leg 101 pivotally mounted to the aircraft structure about an axis 150 which is essentially perpendicular to the longitudinal midplane of said aircraft, and which is fitted with at least one wheel stub axle 108, together with an associated driving actuator 110 for lowering and raising said landing gear leg.

In accordance with an essential aspect of the invention, the landing gear leg 101 is made up of two elements 102 and 103 which are hinged together about an axis 104 parallel to the pivot axis 150 of said leg and which are connected together by a shock absorber 105 having a bottom element 102 implemented in the form of a rocker whose free end is fitted with at least one wheel stub axle 108, and a top element 103 implemented in the form of a panel whose free end is hinged to the driving actuator 110, said driving actuator also being a shock-absorbing actuator having a force threshold which applies a predetermined torque tending to keep the landing gear leg 101 in the position that it occupies during landing, while nevertheless allowing said leg to be raised with controlled force in the event of a crash landing.

Before describing the various stages in moving the raisable landing gear 100 of the invention, the description begins with more detail concerning the structural components of the landing gear, and initially, in particular, the two elements constituting the leg of the landing gear 101, followed by the driving actuator associated therewith which is implemented in the form of a shock-absorbing actuator having a force threshold.

In the embodiment shown in FIGS. 1 and 2, the rocker-forming bottom element 102 is directly hinged to the structure of the aircraft: the fragmentary section of FIG. 2 thus shows the ends 102.6 of the rocker-forming bottom element 102 corresponding to the hinge (axis 150) on a portion 151 forming a portion of the structure of the aircraft. The panel-forming top element 103 is hinged to the rocker-forming bottom element 102, and one of the two associated ends of the hinge 103.3 of said top element can be seen which defines a hinge axis 104 that in this case coincides with the pivot axis 150 relative to the structure of the aircraft. In a different variant of the landing gear of the invention, described below in greater detail with reference to FIGS. 5 and 6, it will be seen that the landing gear leg can be made of two mutually hinged elements in such a manner that the axes 104 and 150 are offset slightly.

The rocker-forming bottom element 102 is generally triangular in shape in this case, having two sloping arms 102.1 and a stiffening base 102.2, the two arms meeting at the bottom of the element by means of an assembly 102.3 which is angularly offset relative to said arm (as can be seen in FIG. 1), and which forms a wheel support that is rotatable about the axis 140. At the bottom end of this support 102.3, there is a swivel-mounted fork 102.5 which supports a wheel stub axle 108 associated with two landing gear wheels 109. Only one of the two wheels of the raisable landing gear 100 is shown in the drawings, but it will naturally be understood that the invention is not limited in any way to the number of wheels used. The rocker-forming bottom element thus moves between a lower position which corresponds to its position for landing (shown in solid lines in FIG. 1) and a raised position (shown in chain-dotted lines in FIG. 1). The position of the rocker-forming bottom element 102 when the landing gear is under static load is also shown in part by means of dashed lines, in which position the axis 140 of the swivel wheel support is essentially vertical. The rocker-forming bottom element 102 also has a hinged connection with the shock absorber 105. In this case, this connection is organized by providing two appendices 102.4 that enable the end 105.3 of the body 105.1 on said shock absorber 105 to be hinged about a hinge axis that is referenced 106. Finally, it can be seen that the line joining the common hinge axis 104, 150 to the axis of the wheel stub axles defines an angle a relative to the vertical which, when the landing gear is in its landing position, is of the order of 20°.

The panel-forming top element 103 is also generally triangular in shape in this case, having two sloping arms 103.1, with the free ends 103.3 thereof being associated with the hinge between said elements and the rocker-forming bottom element 102. The arms 103.1 are united by a stiffener 103.2 and they are terminated at the top by a pair of appendices 103.4 that provide hinged connections with the shock absorber 105 and with the shock-absorbing actuator 110. The shock absorber 105 has a sliding rod 105.2 whose end 105.4 is hinged to the panel-forming top element 103 about an axis 107. The shock-absorbing actuator 110 has a front end 113 hinged to the top portion of the above-mentioned appendices 103.4 about an axis referenced 114. The rear end 111 of said shock-absorbing actuator 110 is hinged at 112 to the structure of the aircraft, with said shock-absorbing actuator being housed in the housing L associated with the raisable landing gear, behind the pivot axis of the landing gear leg.

In this case, the shock-absorbing actuator 110 raises the landing gear leg 101 by extending, but it will naturally be understood that this is not essential in any way and that other organizations could be provided that include a shock-absorbing actuator, likewise having a force threshold, but that on the contrary lowers the landing gear leg when it extends. In the present example, the shock-absorbing actuator 110 has a cylinder 115 in which a rod-piston 116 slides, with the axis of the assembly being referenced X. As will be better understood from the more detailed described of the precise structure of the shock-absorbing actuator, with reference to FIG. 4, it can be seen that the front portion of the cylinder 115 is associated with normal lowering and raising of the shock absorber leg 101, whereas the rear portion thereof is associated with the peak-limiting function associated with energy absorption in the event of a crash landing.

In all normal situations, the shock-absorbing actuator 110 behaves like a simple driving hydraulic actuator, i.e. its rear portion acts like an end wall. The landing gear leg 101 is then lowered under normal conditions by retracting the rod-piston 116 into the cylinder 115 of the shock-absorbing actuator 110 until the position shown in solid lines in FIG. 1 is reached. When the landing gear wheels make contact with the ground, and assuming that landing conditions are normal, the shock absorber 105 acts on its own and its sliding rod is correspondingly retracted into its cylinder, i.e. the angle defined between the two elements 102 and 103 forming the landing gear leg 101 is reduced accordingly, while the position of the axis 114 remains practically stationary. Under static loading, the axis 140 is essentially vertical, and the shock absorber 105 is compressed. After the aircraft has taken off, the shock absorber 105 expands and the landing gear is raised under normal conditions by extending the rod-piston from the shock-absorbing actuator 110.

In contrast, if contact is made with the ground with too great a jolt, i.e. if the vertical component of the landing speed exceeds a predetermined threshold, e.g. 3 meters per second (m/s) or 4 m/s, then crash landing conditions apply and the wheels of the landing gear very quickly transmit a large force to the landing gear leg. Under such circumstances, the shock absorber 105 transmits forces which apply a large amount of torque on the panel-forming top element 103, thereby rotating said element by exerting violent traction on the front end of the shock-absorbing actuator 110 having a force threshold. Under such circumstances, the said force threshold is exceeded, and the shock-absorbing actuator allows the landing gear leg 101 to pivot in the raising direction and with a controlled amount of force.

The shock-absorbing actuator having a force threshold 110 thus applies a predetermined amount of torque (due to the force it exerts along the direction of its axis X) which tends to maintain the leg 101 in the position that it occupies during landing, so long as the forces applied by the wheels do not exceed the corresponding force threshold. In contrast, in the event of a crash landing, the shock-absorbing actuator 110 no longer acts like a mere hydraulic-drive actuator, but provides a peak-limiting function with energy absorption that allows the leg to pivot in the raising direction.

FIG. 3 shows the above-described landing gear in its fully raised position after a crash landing, with the landing gear leg having thus tilted so that it enters into the association housing L in the structure of the aircraft. It should be observed that this position is slightly different from the position which the landing gear occupies when raised normally: when raised normally, the shock absorber 105 is relaxed, whereas in the event of a crash landing, the shock absorber is compressed, such that the angle between the two component elements of the landing gear leg is smaller.

FIGS. 5 and 6 show a variant of the above landing gear with many parts analogous to those described above with reference to FIGS. 1 and 2. The raisable landing gear 200 is similar in structure to the raisable gear landing gear 100, with the essential difference residing in the way in which the hinge is organized between the two elements that make up the landing gear leg. The other members which are common with the above-described landing gear are therefore given the same references as before and are not described again.

The landing gear leg 101 of the raisable landing gear 200 includes a panel-forming top element 103 which is now directly hinged to the structure of the aircraft. This top element is again triangular in shape, however its two arms 103.1 are united by a branch 103.5 associated with the hinge to the structure 151 of the aircraft level within the pivot axis 150 of the landing gear leg. The upper portion of the top element 103 is unchanged, and retains the same hinges with the shock absorber 105 (about the axis 107) and with the shock-absorbing actuator 110 (about the axis 114). The rocker-forming bottom element 102 is hinged on associated appendices 103.6 on the panel-forming top element 103 about an axis 104 which no longer coincides with the pivot axis 150, but which is slightly offset relative thereto. Such an embodiment is advantageous insofar as the panel-forming top element is less subjected to bending forces.

As before, the rocker-forming bottom element 102 is generally triangular in shape, having two arms 102.1 whose ends 102.7 are associated with the appendices 103.6 of the panel-forming top element 102 level with the associated axis 104. The remaining portion of the rocker-forming bottom element 102 is essentially identical to that described above.

As can be seen more clearly in FIG. 5, it should be observed that the appendices 103.6 of the panel-forming top element 103 are organized in such a manner that the associated axis 104 of these appendices is slightly offset behind the pivot axis 105 when in the landing position. Such a disposition is favorable insofar as it also participates in the torque exerted on the panel-forming top element 103 in the event of a crash landing, thereby assisting the action of the shock absorber 105.

It is of interest to observe that in both embodiments described above, the hinge axis 107 of the shock absorber 105 relative to the panel-forming top element 103, the hinge axis 114 of the shock-absorbing actuator 110 relative to the same element, and the pivot axis 150 are not only parallel, but they also lie in the same plane.

Such an alignment is naturally favorable for distributing forces in the panel-forming top element 103.

The structure of the shock-absorbing actuator fitted to the above-described raisable landing gear is now described with reference to FIG. 4, which actuator is applicable to either of the two various embodiments described.

The shock-absorbing actuator 110 includes a cylinder 115 in which a rod-piston 116 slides. The cylinder 115 has a front portion 115.1 associated with the end hinge element 113 (the axis 114 corresponding to the hinge can be seen in the upper portion of the panel-forming top element of the landing gear leg). The cylinder 115 includes an intermediate portion 115.2 delimited by a front end 117 and an intermediate partition 119, said portion of the shock-absorbing actuator being associated with normal lowering and raising of the landing gear leg. The front portion of the rod-piston 116 that includes a piston 123 slides in sealed manner inside the cylinder because of associated sealing rings 124 and 127. The portion 115.2 thus corresponds to a first hydraulic fluid chamber 120 associated with normal lowering and raising of the leg. Finally, the cylinder 115 includes a rear portion 115.3 defining a second chamber 125 which is delimited by the above-mentioned intermediate partition 119 and the end 126 of the cylinder. A separator piston 131 slides in sealed manner inside said rear portion 115.3 over an internal sleeve 137 of the cylinder, via two associated sealing rings 133.1 and 133.2 and on one side this piston delimits a chamber 130 that communicates via at least one channel 129 (only two channels can be seen in this case) with the annular chamber 120.1 of the first hydraulic chamber 120. The full section chamber of said first chamber 120 is referenced 120.2. The other side of the separator piston 131 delimits a high pressure gas chamber 132 whose pressure determines the force threshold for extending the rod 107 that operates in the event of a crash landing, the shock-absorbing actuator 110 then extending to raise the landing gear leg. The chamber 132 is initially filled with a high pressure gas via an associated inflation valve 118. A guiding and protecting ring 128 is provided, in this case, level with the rear end of the cylinder 115.

The central portion 115.2 of the cylinder 115 also includes two end orifices 121.1 and 121.2 which communicate with the hydraulic circuit of the aircraft via connection members (such as distributor valves) referenced 122.1 and 122.2. The three connection lines associated with each of these distributor valves are diagrammatically marked X, R, and A, and they correspond respectively to closing, to returning to the hydraulic return tank, and to admitting hydraulic fluid under pressure. As will easily be understood, admitting hydraulic fluid via the associated orifice 121.2 causes the rod-piston 116 to be extended, with fluid from the annular chamber 120.1 leaving via the other associated orifice 121.1 because the separator piston 131 is kept pressed against the intermediate partition 119 by an associated flange 131.1. This thus causes the landing gear to be raised under normal conditions. In contrast, to extend the landing gear, the hydraulic fluid is admitted via the orifice 121.1 into the annular chamber 120.1, and the fluid in the chamber 120.2 returns to the hydraulic circuit via the associated orifice 121.2.

In the event of a crash landing, the distributor valve 122.1 is closed (line X) such that the traction force exerted violently on the front end of the cylinder then causes the hydraulic fluid of the annular chamber 120.1 to pass through the channels 129 into the chamber 130, pushing against the separator piston 131: the rod-piston is thus extended under full control, and the shock-absorbing actuator 110 allows the landing gear leg to be raised by pivoting. In addition, when said rod-piston has been extended in this way, it is appropriate to be able to control subsequent relaxing of the gas: to this end, a floatingly-mounted valve member 134 is provided whose axial stroke is limited firstly by the intermediate partition 119 and secondly by a collar 136 on the internal sleeve 137 of the cylinder which serves to delimit the second chamber 125. The floatingly-mounted valve member 134 also has small-diameter bores 135 coinciding with at least some of the orifices of the channels 129 thus making it possible when the floatingly-mounted valve member is bearing against the intermediate partition 119 to achieve throttling that provides accurate control of the subsequent expansion of the gas.

As for the shock absorber 105 disposed between the two elements making up the landing gear leg, a conventional type of oleo-strut could be used, e.g. a shock absorber having a single low-pressure chamber.

The invention is not limited to the embodiments described above, but on the contrary extends to any variant which uses equivalent means to reproduce the essential features specified above.

I claim:

1. Raisable landing gear for a heavier-than-air aircraft, the landing gear including a landing gear leg pivotally mounted to the structure of an aircraft about a pivot axis that is essentially perpendicular to the longitudinal midplane of said aircraft and fitted with at least one wheel stub axle, and also with an associated driving actuator for lowering and raising said leg, wherein the landing gear leg is implemented in the form of two elements one of which is hinged to the structure of the aircraft about an axis which constitutes said pivot axis of the leg, the said two elements being hinged to each other about an axis parallel to the pivot axis of said leg and being connected together by means of a shock absorber; one of said elements is a bottom element implemented in the form of a rocker whose free end is fitted with at least one wheel stub axle, and; the other one of said elements is a top element implemented in the form of a panel whose free end is hinged to the driving actuator, and wherein said driving actuator is a shock-absorbing actuator having a force threshold which applies a predetermined torque tending to maintain the leg in the position that it occupies during landing, while allowing said leg to be raised against controlled forces in the event of a crash landing.

2. Raisable landing gear for a heavier-than-air aircraft, the landing gear including: a landing gear leg pivotally mounted to the structure of an aircraft about a pivot axis that is essentially perpendicular to the longitudinal midplane of said aircraft and fitted with at least one wheel stub axle, and also with an associated driving actuator for lowering and raising said leg; wherein the landing gear leg is implemented in the form of two elements, one of which is hinged to the structure of the aircraft about an axis which constitutes said pivot axis of the leg, the said two elements being hinged to each other about an axis which extends in the same direction as the pivot axis of said leg and being connected together by means of a shock absorber; one of said elements is a bottom element implemented in the form of a rocker whose free end is fitted with at least one wheel stub axle; the other one of said elements is a top element implemented in the form of a panel whose free end is hinged to the driving actuator; wherein said one element that is hinged to the aircraft structure is the rocker forming bottom element, and the panel-forming top element is hinged to said rocker about an axis which coincides with the pivot axis; and wherein said driving actuator is a shock-absorbing actuator having a force threshold which applies a predetermined torque tending to maintain the leg in the position that it occupies during landing, while allowing said leg to be raised against controlled forces in the event of a crash landing.

3. Landing gear according to claim 1, wherein said one element that is hinged to the aircraft structure is the panel-forming top element, and the rocker-forming bottom element is hinged to associated appendices of said panel about an axis which is slightly offset relative to the pivot axis.

4. Landing gear according to claim 3, wherein the appendices of the panel-forming top element are organized in such a manner that the axis associated with said appendices is offset in the landing position rearwardly relative to the pivot axis.

5. Landing gear according to claim 1, wherein the pivot axis and the hinge axes between the panel-forming top element and both the shock absorber and the shock-absorbing actuator all lie in the same plane.

6. Landing gear according to claim 1, wherein the panel-forming top element is generally triangular in shape, upwardly terminated by two appendices providing the hinged connections with the shock absorber and with the shock-absorbing actuator.

7. Landing gear according to claim 1, wherein the rocker-forming bottom element is generally triangular in shape, being downwardly terminated by an angularly offset assembly that forms a swivel wheel support having an axis that is essentially vertical when the landing gear is under static load.

8. Landing gear according to claim 1, wherein the shock-absorbing actuator extends for the purpose of raising the landing gear leg, and includes a rod-piston and a cylinder having two successive chambers separated by an intermediate partition but in communication with each other, there being a first chamber for hydraulic fluid associated with lowering and raising the leg under normal conditions, and a second chamber in which a separator piston delimits a high pressure gas chamber whose pressure defines the force threshold for extending the rod-piston in the event of a crash landing.

9. Landing gear according to claim 8, wherein a distributor valve is associated with the first chamber to cause the hydraulic fluid of the corresponding annular chamber to transit into the second chamber by passing through at least one associated channel when said distributor valve is closed for the purpose of pushing said separator piston, a floatingly-mounted valve member also being provided in said second chamber level with the orifice of each channel to control subsequent expansion of the gas.

10. Landing gear according to claim 1, wherein the shock absorber interconnecting the two hinged elements forming the leg is an oleo-strut of the single low-pressure chamber type.

* * * * *